(12) United States Patent
Kim et al.

(10) Patent No.: US 9,072,986 B2
(45) Date of Patent: Jul. 7, 2015

(54) METHOD AND APPARATUS FOR SECURING FRACTIONATION TRAYS

(75) Inventors: SooWoong Kim, Flower Mound, TX (US); Namsun Ku, Nonsan (KR)

(73) Assignee: GTC Technology US LLC, Houston, TX (US)

(*) Notice: Subject to any disclaimer, the term of this patent is extended or adjusted under 35 U.S.C. 154(b) by 621 days.

(21) Appl. No.: 13/401,601

(22) Filed: Feb. 21, 2012

(65) Prior Publication Data

US 2012/0211347 A1    Aug. 23, 2012

Related U.S. Application Data

(60) Provisional application No. 61/445,898, filed on Feb. 23, 2011.

(51) Int. Cl.
*B01D 3/32* (2006.01)
*B23P 11/00* (2006.01)

(52) U.S. Cl.
CPC ........... *B01D 3/326* (2013.01); *Y10T 29/49948* (2015.01); *Y10T 29/49963* (2015.01); *B01J 2208/00884* (2013.01); *B23P 11/00* (2013.01); *B01D 3/324* (2013.01)

(58) Field of Classification Search
CPC .......... B01D 3/32; B01D 3/324; B01D 3/326; B01J 2208/00884; B23P 11/00
USPC ............... 202/267.1, 270; 203/86; 29/525.02, 29/525.11; 422/566, 221, 311
See application file for complete search history.

(56) References Cited

U.S. PATENT DOCUMENTS

| 2,582,826 | A |   | 1/1952 | Glitsch |
|-----------|---|---|--------|---------|
| 2,611,457 | A | * | 9/1952 | Glitsch ............... 261/114.1 |
| 2,718,901 | A |   | 9/1955 | Nutter |
| 2,752,139 | A |   | 6/1956 | Huggins |
| 2,752,229 | A |   | 6/1956 | Brown et al. |
| 2,787,453 | A |   | 4/1957 | Hibshman et al. |
| 2,853,281 | A |   | 9/1958 | Hibshman et al. |
| 2,903,251 | A |   | 9/1959 | Thrift |
| 2,951,691 | A |   | 9/1960 | Nutter |
| 3,039,751 | A |   | 6/1962 | Versluis |
| 3,048,957 | A |   | 8/1962 | Middleton |
| 3,080,155 | A |   | 3/1963 | Glitsch et al. |
| 3,087,711 | A |   | 4/1963 | Glitsch |

(Continued)

FOREIGN PATENT DOCUMENTS

EP    010877 B1    3/1983

OTHER PUBLICATIONS

Glitsch, Inc., "Ballast Tray Design Manuel", Bulletin 4900, Sixth Edition, 1993, (40 pages).

(Continued)

*Primary Examiner* — Nina Bhat
*Assistant Examiner* — Jonathan Miller
(74) *Attorney, Agent, or Firm* — Winstead PC

(57) ABSTRACT

A chemical-process system includes a chemical-process column and a support disposed on an interior of the chemical-process column. A tray is disposed on a top surface of the support. A bolt is disposed through the tray and a clamp is disposed below the tray. The clamp has a notch formed therein for receiving a head region of the bolt. The clamp engages a bottom surface of the tray and a bottom surface of the support. The bolt is able to angularly displace with respect to at least one of the tray and the clamp.

9 Claims, 4 Drawing Sheets

(56) References Cited

U.S. PATENT DOCUMENTS

| | | | |
|---|---|---|---|
| 3,143,482 | A | 8/1964 | McLeod et al. |
| 3,146,280 | A | 8/1964 | Forgrieve |
| 3,233,708 | A | 2/1966 | Glitsch |
| 3,245,669 | A | 4/1966 | Huggins et al. |
| 3,282,576 | A | 11/1966 | Bruckert et al. |
| 3,287,004 | A | 11/1966 | Nutter |
| 3,338,566 | A | 8/1967 | Kittel |
| 3,399,871 | A | 9/1968 | Bon |
| 3,463,464 | A | 8/1969 | Nutter et al. |
| 3,729,179 | A | 4/1973 | Keller |
| 3,759,494 | A | 9/1973 | Axelrod et al. |
| 3,959,419 | A | 5/1976 | Kitterman |
| 4,120,919 | A | 10/1978 | McClain |
| 4,133,852 | A | 1/1979 | DiNicolantonio et al. |
| 4,174,363 | A | 11/1979 | Bruckert |
| 4,201,626 | A | 5/1980 | Asdigian |
| 4,207,174 | A | 6/1980 | Christman |
| 4,247,521 | A | 1/1981 | Forte et al. |
| 4,275,021 | A | 6/1981 | Kirkpatrick et al. |
| 4,374,786 | A | 2/1983 | McClain |
| 4,499,035 | A | 2/1985 | Kirkpatrick et al. |
| 4,504,426 | A | 3/1985 | Chuang et al. |
| 4,519,960 | A | 5/1985 | Kitterman et al. |
| 4,528,068 | A | 7/1985 | Fiocco et al. |
| 4,543,218 | A * | 9/1985 | Bardo et al. .............. 261/24 |
| 4,543,219 | A | 9/1985 | Yamato et al. |
| 4,550,000 | A | 10/1985 | Bentham |
| 4,597,916 | A | 7/1986 | Chen |
| 4,603,022 | A | 7/1986 | Yoneda et al. |
| 4,604,247 | A | 8/1986 | Chen et al. |
| 4,710,326 | A | 12/1987 | Seah |
| 4,729,857 | A | 3/1988 | Lee et al. |
| 4,816,191 | A | 3/1989 | Berven et al. |
| 4,842,778 | A | 6/1989 | Chen et al. |
| 4,855,089 | A | 8/1989 | Michels |
| 4,909,967 | A | 3/1990 | Binkley et al. |
| 4,933,047 | A | 6/1990 | Bannon |
| 4,956,127 | A | 9/1990 | Binkley et al. |
| 4,981,265 | A | 1/1991 | Buhlmann |
| 5,051,214 | A | 9/1991 | Chen et al. |
| 5,098,615 | A | 3/1992 | Resetarits |
| 5,106,556 | A | 4/1992 | Binkley et al. |
| 5,120,474 | A | 6/1992 | Binkley et al. |
| 5,147,584 | A | 9/1992 | Binkley et al. |
| 5,164,125 | A | 11/1992 | Binkley et al. |
| 5,192,465 | A | 3/1993 | Petrich et al. |
| 5,192,466 | A | 3/1993 | Binkley |
| 5,277,848 | A | 1/1994 | Binkley et al. |
| 5,453,222 | A | 9/1995 | Lee et al. |
| 5,468,425 | A | 11/1995 | Nutter |
| 5,547,617 | A | 8/1996 | Lee et al. |
| 5,573,714 | A | 11/1996 | Monkelbaan et al. |
| 5,762,834 | A | 6/1998 | Hauser et al. |
| 5,783,119 | A | 7/1998 | Ulrich et al. |
| 5,895,608 | A | 4/1999 | Lee et al. |
| 5,906,773 | A | 5/1999 | Hausch et al. |
| 5,911,922 | A | 6/1999 | Hauser et al. |
| 5,921,109 | A | 7/1999 | Billingham et al. |
| 6,053,484 | A | 4/2000 | Fan et al. |
| 6,068,244 | A | 5/2000 | Burton et al. |
| 6,089,550 | A | 7/2000 | Petschauer et al. |
| 6,113,079 | A | 9/2000 | Urbanski et al. |
| 6,145,816 | A | 11/2000 | Chuang et al. |
| 6,224,043 | B1 | 5/2001 | Fan et al. |
| 6,293,526 | B1 | 9/2001 | Fischer et al. |
| 6,422,539 | B1 | 7/2002 | Burton et al. |
| 6,502,806 | B2 | 1/2003 | Richardson |
| 6,540,213 | B2 | 4/2003 | Bachmann et al. |
| 6,568,663 | B1 | 5/2003 | Xu et al. |
| 6,575,437 | B2 | 6/2003 | Fischer et al. |
| 6,588,736 | B1 | 7/2003 | Chuang et al. |
| 6,592,106 | B1 | 7/2003 | Eaton, Jr. |
| 6,629,687 | B1 | 10/2003 | Gage |
| 6,722,639 | B2 | 4/2004 | Ender et al. |
| 6,736,378 | B2 * | 5/2004 | Colic et al. .............. 261/114.1 |
| 6,739,585 | B1 | 5/2004 | Urbanski et al. |
| 6,755,943 | B1 * | 6/2004 | Mizutani et al. .............. 203/99 |
| 6,799,752 | B2 | 10/2004 | Wu et al. |
| 6,962,661 | B2 | 11/2005 | Northup, Jr. et al. |
| 7,045,103 | B2 | 5/2006 | McDougald et al. |
| 7,052,654 | B2 | 5/2006 | McDougald et al. |
| 7,078,002 | B2 | 7/2006 | Van Vliet et al. |
| 7,125,004 | B2 | 10/2006 | Dollie et al. |
| 7,125,005 | B2 * | 10/2006 | Colic et al. .............. 261/114.1 |
| 7,155,801 | B2 * | 1/2007 | Hammon et al. .............. 29/559 |
| 7,235,158 | B2 | 6/2007 | Matsumoto et al. |
| 7,270,315 | B2 | 9/2007 | Burton et al. |
| 7,282,118 | B2 * | 10/2007 | Mitsumoto et al. .............. 203/8 |
| 7,540,476 | B2 | 6/2009 | Pilling et al. |
| 7,556,734 | B2 | 7/2009 | Lee et al. |
| 7,712,728 | B2 | 5/2010 | Kehrer |
| 7,896,039 | B2 | 3/2011 | Bachmann et al. |
| 8,006,716 | B2 | 8/2011 | Zhang et al. |
| 8,720,870 | B2 | 5/2014 | Pilling et al. |
| 2002/0041040 | A1 | 4/2002 | Fischer et al. |
| 2003/0067085 | A1 | 4/2003 | Shakur et al. |
| 2004/0037759 | A1 | 2/2004 | Van Vliet et al. |
| 2004/0151643 | A1 | 8/2004 | McDougald et al. |
| 2004/0182013 | A1 | 9/2004 | Kehrer |
| 2007/0126134 | A1 | 6/2007 | Xu et al. |
| 2007/0295591 | A1 | 12/2007 | Mosler |
| 2008/0018003 | A1 | 1/2008 | Pilling et al. |
| 2008/0245651 | A1 | 10/2008 | Werlen et al. |
| 2008/0277260 | A1 | 11/2008 | Binkley et al. |
| 2010/0288624 | A1 | 11/2010 | Kim et al. |
| 2011/0278745 | A1 | 11/2011 | Pilling et al. |
| 2012/0024977 | A1 | 2/2012 | Buttridge et al. |
| 2012/0118399 | A1 | 5/2012 | Binkley et al. |
| 2012/0211347 | A1 | 8/2012 | Kim et al. |
| 2012/0300577 | A1 | 11/2012 | Buttridge et al. |

OTHER PUBLICATIONS

Axens IFP Group Technologies, "Equiflow Reactor Internals for Optimal Catalyst Utilization", Axens Process Licensing, Jun. 2006, 4 pages.

GTC Technology, "GT-BenZap Technology Licensing". Engineered to Innovate, 2009, 2 pages.

Shell, "Shell Global Solutions' Portfolio for Reactor Engineering Technology", Shell Global Solutions, 2002, 3 pages.

Young, Lee W., "International Search Report" for the International Application PCT/IB11/02695 as mailed Apr. 17, 2012. (4 pages).

Pilling Mark, et al., Mini Valve, Hydrocarbon Engineering, Apr. 2013 [3 pages].

Kister, Henry Z., "Distillation Design", ch. 6, pp. 265, 296, 331, 299-301, ch. 7, pp. 382-394, ch. 9, pp. 537-554, McGraw-Hill, 1992.

* cited by examiner

METHOD AND APPARATUS FOR SECURING FRACTIONATION TRAYS

CROSS-REFERENCE TO RELATED APPLICATIONS

This application claims priority to, and incorporates by reference for any purpose the entire disclosure of, U.S. Provisional Patent Application No. 61/445,898, filed Feb. 23, 2011.

BACKGROUND

1. Field of the Invention

The present application relates generally to fractionation tray hardware and more particularly, but not by way of limitation, to hardware utilized for securing fractionation trays within a chemical-process column.

2. History of the Related Art

Chemical-process columns are utilized to separate select components from a multicomponent stream. Successful separations in the chemical-process column are dependent upon intimate contact between heavier fluids and lighter fluids. Several types of contact mechanisms enhance contact between a fluid in a vapor phase and a fluid in a liquid phase. Contact devices such as, for example, trays are characterized by relatively high pressure drop and relatively high fluid hold-up. Other types of contact apparatus include high-efficiency packing. High-efficiency packing is energy-efficient because it has low pressure drop and low fluid hold-up.

Typically, chemical-process columns utilize either trays, packing, or combinations thereof. Tray designs such as, for example, sieve trays and valve tray are effective and often applied in chemical-process columns. A sieve tray is constructed with a large number of apertures formed in a bottom surface. The apertures permit an ascending lighter fluid to interact with a heavier fluid that is flowing across the sieve tray from a downcomer. Regions of the sieve tray surface are generally referred to as "active" or "inactive". Typically, active tray regions allow the ascending lighter fluid to pass therethrough for interaction and mass transfer with the heavier fluid. Conversely, inactive tray regions do not permit such interaction. It is generally desirable to have as much of a tray surface as possible be "active". Thus, it is desirable to secure the tray to an interior of the chemical-process column in a manner that minimizes inactive tray regions.

Trays are typically secured within chemical-process columns by clamps that engage a support affixed to an interior of the chemical-process column. Typically, the clamps are tightened by way of bolts arranged generally perpendicular to the tray. This method, while effective, is not without problems. First, in most cases, securement of a tray to the support requires a first individual positioned above the tray and a second individual positioned below the tray. Moreover, in cases where the support is thick, the clamps may deflect. As will be described in more detail below, such deflection induces a lateral force in the bolts which, over long periods of use, may cause the clamps to disengage from the support.

SUMMARY

The present invention relates to tray hardware and more particularly, but not by way of limitation, to hardware utilized for securing trays within a chemical-process column. One aspect of the present invention relates to a chemical-process system. The chemical-process system includes a chemical-process column and a support disposed on an interior of the chemical-process column. A tray is disposed on a top surface of the support. A bolt is disposed through the tray and a clamp is disposed below the tray. The clamp has a notch formed therein for receiving a head region of the bolt. The clamp engages a bottom surface of the tray and a bottom surface of the support. The bolt is able to angularly displace with respect to at least one of the tray and the clamp.

Another aspect of the present invention relates to a method for securing a tray in a chemical-process column. The method may include placing the tray on a support formed in an interior of the chemical-process column and securing the tray to the support via a clamp system comprising a clamp and a bolt. The bolt is articulated with respect to at least one of the clamp or the tray.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1A:
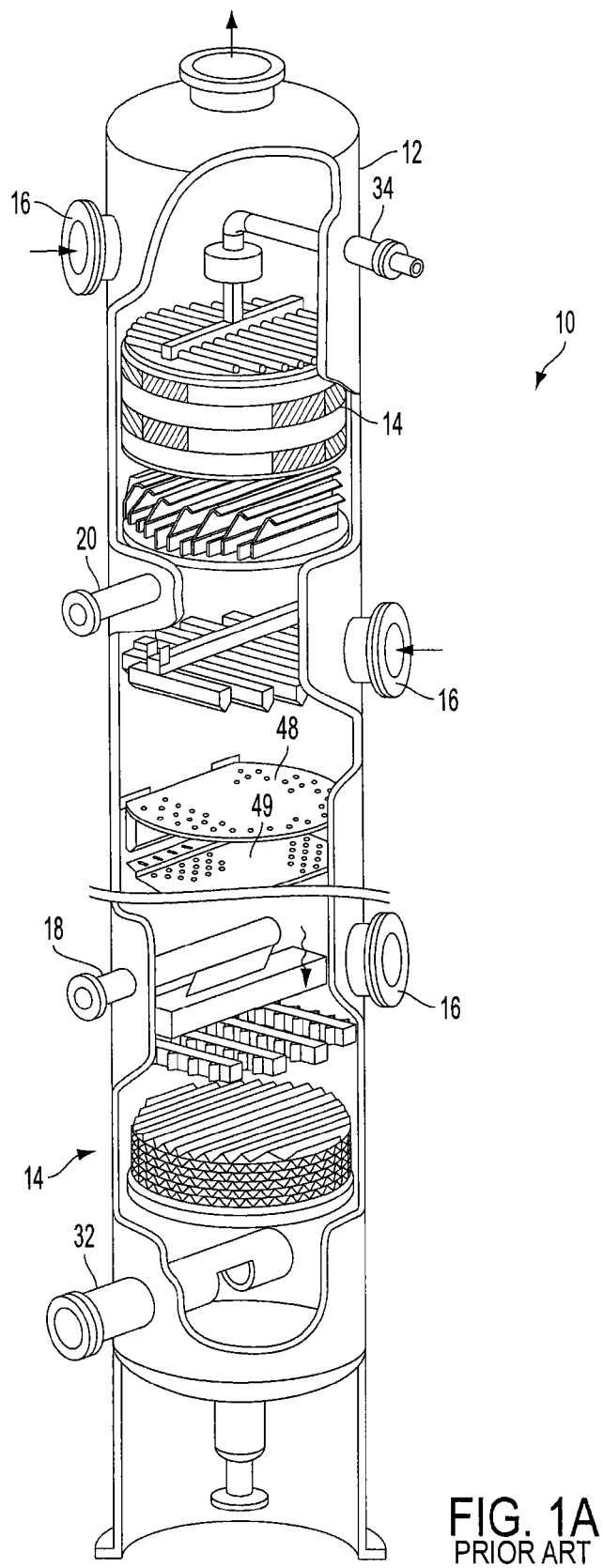
FIG. 1A is a perspective view of a prior-art chemical-process column with various sections cut away for illustrating a variety of internal components.

FIG. 1A, is a perspective view of a prior-art chemical-process column with various sections cut away for illustrating a variety of internal components. A chemical-process column 10 typically comprises a cylindrical tower 12 having at least one of a plurality of packing-bed layers 14 and a plurality of trays 48, 49 disposed therein. In many instances, the plurality of trays 48, 49 are valve trays or sieve trays.

Still referring to FIG. 1A, a plurality of manways 16 are likewise constructed for facilitating access to an internal region of the cylindrical tower 12. Also provided are a side-stream draw-off line 20, a heavier-fluid side-stream-input feed line 18, and a side-stream lighter-fluid feed line (or reboiler-return line) 32. A reflux-return line 34 is provided atop the chemical-process column 10.

Figure 1B:
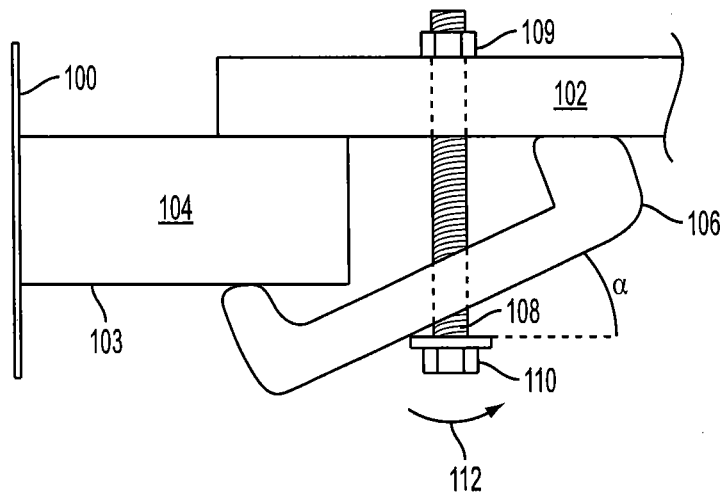
FIG. 1B is a cross-sectional view of a prior-art clamp system.

FIG. 1B is a cross-sectional view of a prior-art clamp system. A tray 102 is secured within an interior space of a chemical-process column 100. A support 104 is affixed to an interior of the chemical-process column 100. The tray 102 rests on the support 104. Typically, a clamp 106 is connected to a bottom surface of the tray 102 via, for example, a bolt 108. A nut 109 is disposed above the tray 102, and receives the bolt 108. Tightening the nut 109 causes the clamp 106 to engage a bottom surface 103 of the support 104 thereby securing the tray 102 within the chemical-process column 100.

Still referring to FIG. 1B, in situations where the clamp 106 engages the support 104 prior to engaging the tray 102, further tightening of the nut 109 causes the clamp 106 to tilt with respect to the bolt 108. An angle α between the bolt 108 and the clamp 106 causes a head region 110 of the bolt 108 to not sit flush on the clamp 106. This arrangement may, over long periods of use, cause the bolt 108 to deflect in a direction as illustrated by arrow 112. Such deflection pulls the clamp 106 toward a center of the tray 102. Such deflection weakens an engagement between the clamp 106 and the support 104. In some cases, such deflection entirely disengages the clamp 106 from the support 104.

Still referring to FIG. 1B, installation of the tray 102 typically requires at least a first worker positioned above the tray 102 and at least a second worker positioned below the tray 102. The second worker must secure the head region 110 of the bolt 108 while the first worker tightens the nut 109. In situations where only a single worker is available, installation of the clamp 106 often requires the head region 110 of the bolt 108 to be welded to the clamp 106.

Figure 2:
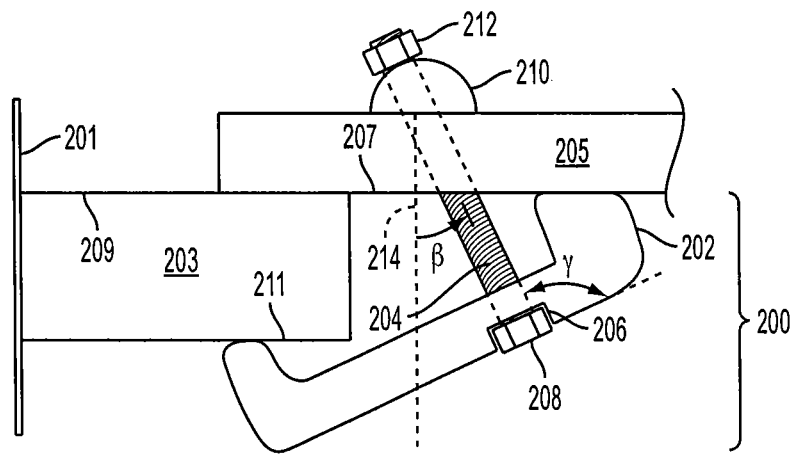
FIG. 2 is a cross-sectional view of a chemical-process column having a clamp system disposed therein according to an exemplary embodiment.

FIG. 2 is a cross-sectional view of a chemical-process column having a clamp system disposed therein according to an exemplary embodiment. A support 203 is secured to an interior of a chemical-process column 201. At least a portion of a bottom surface 207 of a tray 205 is disposed on at least a portion of a top surface 209 of the support 203. A clamp system 200 includes a clamp 202 and a bolt 204. A nut 212 is disposed on a top surface of the tray 205 for receiving the bolt 204. In a typical embodiment, tightening the nut 212 causes the clamp 202 to engage a bottom surface 211 of the support 203. In a typical embodiment, the clamp 202 includes a notch 206 that is sufficiently sized to allow a head region 208 of the bolt 204 to be received and secured therein. In a typical embodiment, the notch 206 captures the head region 208 of the bolt 204 and prevents rotation and deflection of the bolt 204 during tightening of the nut 212. Such an arrangement permits securement of the tray 205 within the chemical-process column 201 by a single worker positioned above the tray 205 thereby eliminating the need for multiple workers. Thus, the clamp system 200 allows lower-cost installation.

Still referring to FIG. 2, a washer 210 and the nut 212 are disposed above the tray 205. In a typical embodiment, the washer 210 is dome shaped. The washer 210 and the nut 212 receive the bolt 204. In a typical embodiment, the washer 210 allows the bolt 204 to be received at an angle β with respect to a vertical axis 214. The washer 210 thereby permits the bolt 204 and the clamp 202 to remain at an angle γ of generally 90 degrees relative to each other despite the angle β between the bolt 204 and the vertical axis 214. Such an arrangement ensures that the head region 208 of the bolt 204 remains flush against the clamp 202 thereby reducing a tendency of the bolt 204 or the clamp 202 to deflect toward the center of the tray 205.

Figure 3:
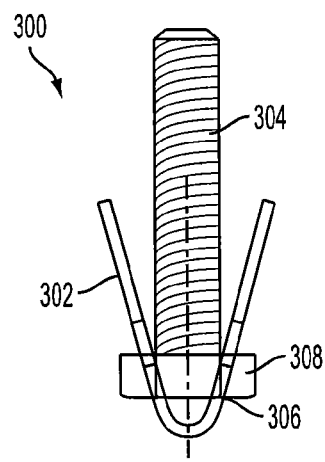
FIG. 3 is an end view of a clamp system according to an exemplary embodiment.

FIG. 3 is an end view of a clamp system according to an exemplary embodiment. A clamp system 300 includes a clamp 302 and a bolt 304. The clamp 302 comprises a "V" shaped profile. In a typical embodiment, the "V" shaped profile is capable of withstanding greater force while consuming less material. In a typical embodiment, a notch 306 is disposed in the clamp 302. The notch 306 is sufficiently sized to allow a head region 308 of the bolt 304 to be received and secured therein. In a typical embodiment, the notch 306 captures and secures the head region 308 of the bolt 304 and prevents rotation and deflection of the bolt 304 during installation. In a typical embodiment, the clamp system 300 permits securement of a tray such as, for example, the tray 205 (shown in FIG. 2) within a chemical-process column by a single worker located above the tray thereby eliminating the need for multiple workers. Thus, the clamp system 300 allows lower-cost installation.

Figure 4:
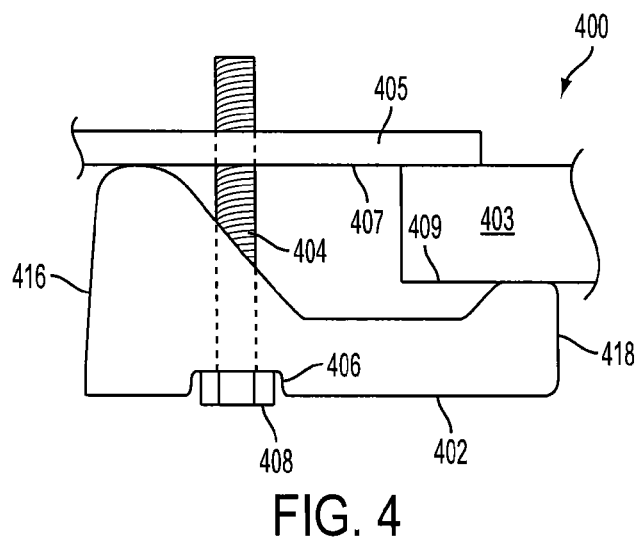
FIG. 4 is a side view of a clamp system according to an exemplary embodiment.

FIG. 4 is a side view of a clamp system according to an exemplary embodiment. The clamp system 400 includes a clamp 402 and a bolt 404. The clamp 402 includes a long-leg region 416 and a short-leg region 418. In a typical embodiment, the long-leg region 416 engages a bottom surface 407 of a tray 405 while the short-leg region 418 engages a bottom surface 409 of the support 403. A notch 406 is disposed on a side of the clamp 402 corresponding with the long-leg region 416; however, in various alternative embodiments, the notch 406 is located in other positions relative to the long-leg region 416. In a typical embodiment, the notch 406 is sufficiently sized to receive and secure a head region 408 of the bolt 404. The notch 406 captures the head region 408 of the bolt 404 and prevents rotation and deflection of the bolt 404 during tightening of a nut such as, for example the nut 212 (shown in FIG. 2).

Figure 5:
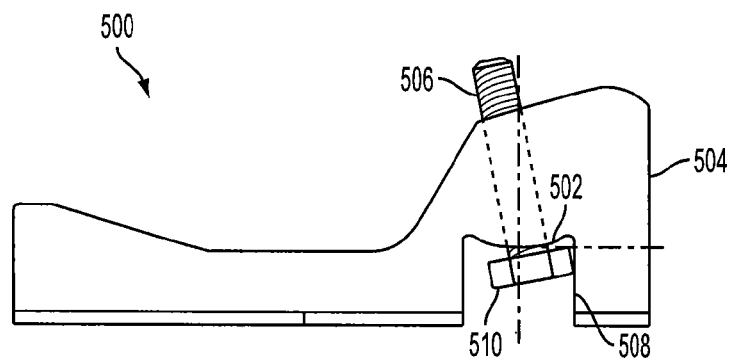
FIG. 5 is a side view of a clamp system according to an exemplary embodiment.

FIG. 5 is a side view of a clamp system according to an exemplary embodiment. In a typical embodiment, a clamp system 500 includes a clamp 504 and a bolt 506. In a typical embodiment, the clamp 504 includes a notch 508. The notch 508 is sufficiently sized to receive and secure a head region 510 of the bolt 506. The notch 508 captures the head region 510 of the bolt 506 and prevents rotation and deflection of the bolt 506 during tightening of a nut such as, for example, the nut 212 (shown in FIG. 2). In a typical embodiment, a rounded bolt seat 502 is located within the notch 508. The rounded bolt seat 502 permits movement of the bolt 506 relative to the clamp 504 while allowing the head region 510 of the bolt 506 to remain generally flush with the clamp 504. In various embodiments, the rounded bolt seat 502 permits sufficient movement of the bolt 506 relative to the clamp 504 such that a washer such as, for example, the washer 210 (shown in FIG. 2) is not required. In a typical embodiment, the clamp system 500 permits securement of a tray such as, for example, the tray 205 (shown in FIG. 2) within a chemical-process column by a single worker positioned above the tray thereby eliminating the need for multiple workers. Thus, the clamp system 500 allows lower-cost installation.

Figure 6:
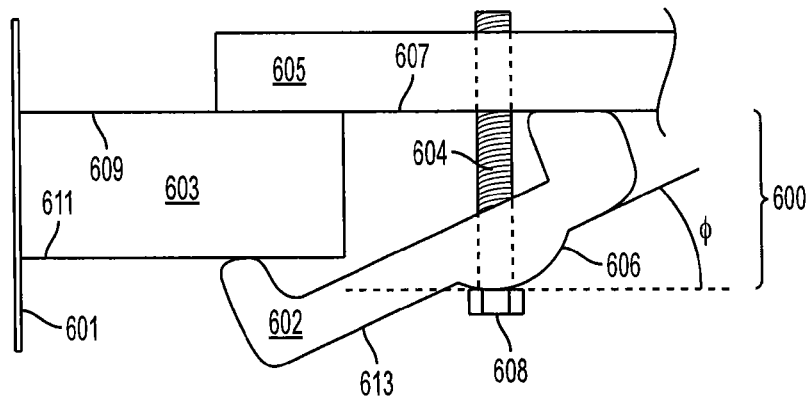
FIG. 6 is a cross-sectional view of a chemical-process column having a clamp system disposed therein according to an exemplary embodiment.

FIG. 6 is a cross-sectional view of a chemical-process column having a clamp system disposed therein according to an exemplary embodiment. In a typical embodiment, a support 603 is secured to an interior of a chemical-process column 601. At least a portion of a bottom surface 607 of a tray 605 is disposed on at least a portion of a top surface 609 of the support 603. In a typical embodiment, a clamp system 600 includes a clamp 602 and a bolt 604. The clamp engages a bottom surface 611 of the support 603. A rounded bolt seat 606 extends from an underside 613 of the clamp 602. In a typical embodiment, the rounded bolt seat 606 may be integrally formed with the clamp 602; however, in various alternative embodiments, the rounded bolt seat 606 may be formed separate from the at least one clamp 602 and attached thereto via a process such as, for example, welding or soldering. In a typical embodiment, the rounded bolt seat 606 allows movement of the bolt 604 relative to the clamp 602.

Still referring to FIG. 6, in a typical embodiment, the rounded bolt seat 606 permits the bolt 604 to be received at an angle φ relative to the clamp 602. The rounded bolt seat 606 allows the bolt 604 to remain at an angle of generally 90 degrees relative to the tray 605. Such an arrangement permits a head region 608 of the bolt 604 to remain generally flush against the rounded bolt seat 606 thereby reducing a tendency of the bolt 604 or the clamp 602 to deflect toward the center of the tray 605. In various embodiments, a washer (not explicitly shown) is included above the tray 605. In a typical embodiment, the washer is dome shaped and permits a greater range of motion of the bolt 604 beyond that which is represented by the angle φ. In various alternative embodiments, the washer 210 is not required.

Figure 7:
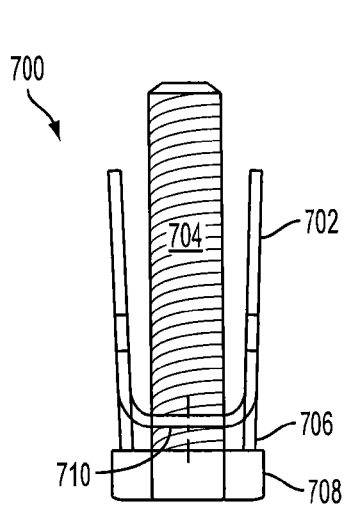
FIG. 7 is an end view of a clamp system according to an exemplary embodiment.

FIG. 7 is an end view of a clamp system of according to an exemplary embodiment. A clamp system 700 includes a clamp 702 and a bolt 704. In a typical embodiment, the clamp 702 comprises a "U" shaped profile. In a typical embodiment, a rounded bolt seat 706 extends from a bottom surface 710 of the clamp 702. The rounded bolt seat 706 permits the bolt 704 to be received at an angle relative to the clamp 704.

Figure 8:
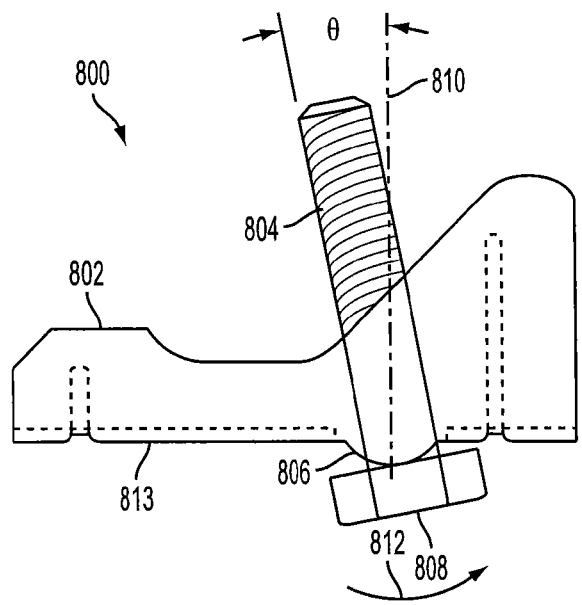
FIG. 8 is a side view of a clamp system according to an exemplary embodiment.

FIG. 8 is a side view of a clamp system according to an exemplary embodiment. A clamp system 800 includes a clamp 802 and a bolt 804. A rounded bolt seat 806 extends from an underside 813 of the clamp 802. In a typical embodiment, the rounded bolt seat 806 may be integrally formed with the clamp 802; however, in various alternative embodiments, the rounded bolt seat 806 may be formed separate from the at least one clamp 802 and attached thereto via a process such as, for example, welding or soldering. In a typical embodiment, the rounded bolt seat 806 permits the bolt 804 to be received at an angle θ relative to a vertical axis 810. Such an arrangement permits a head region 808 of the bolt 804 to remain generally flush against the rounded bolt seat 806 thereby reducing a tendency of the bolt 804 or the clamp 802 to deflect in a direction noted by arrow 812.

Although various embodiments of the method and system of the present invention have been illustrated in the accompanying Drawings and described in the foregoing Detailed Description, it will be understood that the invention is not limited to the embodiments disclosed, but is cable of numerous rearrangements, modifications and substitutions without departing from the spirit of the invention as set forth herein.

What is claimed is:

1. An apparatus comprising:
   a chemical-process column;
   a support disposed on an interior of the chemical-process column;
   a tray disposed on a top surface of the support;
   a bolt disposed through the tray;
   a clamp disposed below the tray, the clamp having a notch formed in a bottom surface thereof for receiving a head region of the bolt;
   wherein the clamp engages a bottom surface of the tray and a bottom surface of the support; and
   wherein, the bolt is able to angularly displace with respect to at least one of the tray and the clamp.

2. The apparatus of claim 1, wherein the clamp comprises a generally U-shaped profile.

3. The apparatus of claim 1, wherein the clamp comprises a generally V-shaped profile.

4. The apparatus of claim 1, wherein the clamp comprises a rounded bolt seat disposed in the notch, wherein the rounded bolt seat permits angular displacement of the bolt with respect to the clamp.

5. The apparatus of claim 1, further comprising a dome-shaped washer disposed on a top surface of the tray for receiving the bolt, wherein the dome-shaped washer permits angular displacement of the bolt with respect to the tray.

6. The apparatus of claim 1, further comprising a rounded bolt seat disposed on an underside of the clamp, wherein the rounded bolt seat permits angular displacement of the bolt with respect to the clamp.

7. The apparatus of claim 1, wherein:
   the bolt is secured by a nut disposed on a top surface of the tray; and
   the notch prevents rotation of the bolt during tightening of the nut wherein the nut is adapted to be tightened by a single worker located on the top surface of the tray.

8. The apparatus of claim 1, wherein the clamp comprises a long-leg region and a short-leg region.

9. The apparatus of claim 8, wherein:
   the long-leg region engages the bottom surface of the tray; and
   the short-leg region engages the bottom surface of the support.

* * * * *